US012003015B2

(12) United States Patent
Yamakawa et al.

(10) Patent No.: US 12,003,015 B2
(45) Date of Patent: Jun. 4, 2024

(54) ANTENNA MODULE, MANUFACTURING METHOD THEREOF, AND COLLECTIVE BOARD

(71) Applicant: Murata Manufacturing Co., Ltd., Nagaokakyo (JP)

(72) Inventors: Yuri Yamakawa, Nagaokakyo (JP); Shigeru Tago, Nagaokakyo (JP); Yoshiki Yamada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 239 days.

(21) Appl. No.: 17/702,786

(22) Filed: Mar. 24, 2022

(65) Prior Publication Data

US 2022/0216590 A1 Jul. 7, 2022

Related U.S. Application Data

(63) Continuation of application No. PCT/JP2020/029223, filed on Jul. 30, 2020.

(30) Foreign Application Priority Data

Sep. 27, 2019 (JP) ................................ 2019-177382

(51) Int. Cl.
*H01Q 1/22* (2006.01)
*H01Q 1/38* (2006.01)
(Continued)

(52) U.S. Cl.
CPC ............. *H01Q 1/2283* (2013.01); *H01Q 1/38* (2013.01); *H01Q 1/48* (2013.01); *H01Q 21/065* (2013.01)

(58) Field of Classification Search
CPC .......... H01Q 1/2283; H01Q 1/38; H01Q 1/48; H01Q 21/065; H01Q 19/005; H01Q 1/521; H01Q 19/021; H01Q 3/2635
See application file for complete search history.

(56) References Cited

U.S. PATENT DOCUMENTS 4,401,988 A * 8/1983 Kaloi .................. H01Q 19/005
343/700 MS
5,008,681 A * 4/1991 Cavallaro ............ H01Q 19/005
343/819

(Continued)

FOREIGN PATENT DOCUMENTS

JP 2001-326429 A 11/2001
JP 2003-289218 A 10/2003

(Continued)

OTHER PUBLICATIONS

International Search Report and Written Opinion dated Oct. 27, 2020, received for PCT Application PCT/JP2020/029223, Filed on Jul. 30, 2020, 9 pages including English Translation.

(Continued)

*Primary Examiner* — Ricardo I Magallanes
*Assistant Examiner* — Jordan E. DeWitt
(74) *Attorney, Agent, or Firm* — XSENSUS LLP

(57) ABSTRACT

An antenna module including a dielectric substrate formed by stacking a plurality of dielectric layers, a radiating element formed on or in the dielectric substrate, a ground electrode facing the radiating element, and peripheral electrodes that are formed in a plurality of layers between the radiating element and the ground electrode at an outer periphery of the dielectric substrate.

20 Claims, 7 Drawing Sheets

(51) Int. Cl.
*H01Q 1/48* (2006.01)
*H01Q 21/06* (2006.01)

(56) References Cited

U.S. PATENT DOCUMENTS

| | | | | |
|---|---|---|---|---|
| 2004/0201524 | A1* | 10/2004 | Yuanzhu | H01P 1/38<br>343/700 MS |
| 2006/0186755 | A1* | 8/2006 | Mori | H05K 1/115<br>310/313 R |
| 2008/0042917 | A1* | 2/2008 | Seki | H01Q 19/195<br>343/837 |
| 2012/0119969 | A1* | 5/2012 | MacDonald | H01L 23/66<br>343/841 |
| 2014/0097995 | A1* | 4/2014 | McKinzie, III | H01Q 21/26<br>29/601 |
| 2014/0125541 | A1* | 5/2014 | Hong | H01Q 1/243<br>343/893 |
| 2014/0354513 | A1* | 12/2014 | Nair | B23K 26/0006<br>343/912 |
| 2015/0022416 | A1* | 1/2015 | Sasaki | H01Q 9/0407<br>343/841 |
| 2015/0207233 | A1* | 7/2015 | Kim | H01Q 9/0485<br>343/785 |
| 2015/0303586 | A1* | 10/2015 | Hafenrichter | H01Q 1/40<br>343/893 |
| 2016/0056544 | A1* | 2/2016 | Garcia | H01Q 9/0407<br>343/725 |
| 2016/0204517 | A1* | 7/2016 | Hu | H01Q 1/523<br>343/824 |
| 2017/0069958 | A1* | 3/2017 | Ko | H01Q 1/38 |
| 2017/0214120 | A1* | 7/2017 | Lee | H01Q 5/42 |
| 2019/0166686 | A1* | 5/2019 | Jo | H05K 1/0271 |
| 2019/0273320 | A1* | 9/2019 | Kim | H01Q 21/065 |
| 2019/0393619 | A1* | 12/2019 | Kim | H01Q 1/523 |
| 2020/0076055 | A1* | 3/2020 | Jeon | H01Q 21/06 |
| 2020/0303805 | A1* | 9/2020 | Ryoo | H01Q 21/28 |
| 2020/0395650 | A1* | 12/2020 | Onaka | H01Q 1/243 |
| 2021/0028559 | A1* | 1/2021 | Hwang | H01Q 15/0086 |
| 2021/0044011 | A1* | 2/2021 | Liu | H01Q 21/065 |
| 2021/0126366 | A1* | 4/2021 | Sudo | H01Q 5/378 |
| 2021/0366838 | A1* | 11/2021 | Han | H01L 23/49838 |
| 2022/0216605 | A1* | 7/2022 | Yamada | H01Q 19/185 |
| 2023/0014567 | A1* | 1/2023 | Yeon | H01Q 9/0414 |
| 2023/0178897 | A1* | 6/2023 | Li | H01Q 5/385<br>343/702 |

FOREIGN PATENT DOCUMENTS

| | | | | | |
|---|---|---|---|---|---|
| JP | 2008-90775 | A | | 4/2008 | |
| JP | 2011-171473 | A | | 9/2011 | |
| WO | 2006/028136 | A1 | | 3/2006 | |
| WO | WO-2006028136 | A1 | * | 3/2006 | H01Q 1/2283 |
| WO | 2016/067969 | A1 | | 5/2016 | |
| WO | 2017/135034 | A1 | | 8/2017 | |
| WO | 2019/107803 | A1 | | 6/2019 | |
| WO | 2019/116756 | A1 | | 6/2019 | |
| WO | WO-2019107803 | A1 | * | 6/2019 | H01Q 1/2283 |
| WO | 2019/174332 | A1 | | 9/2019 | |
| WO | WO-2019174332 | A1 | * | 9/2019 | H01Q 1/002 |

OTHER PUBLICATIONS

Written Opinion of the International Searching Authority dated Oct. 27, 2020, received for PCT Application PCT/JP2020/029223, filed on Jul. 30, 2020, 4 pages. (Previously filed; submitting English translation only.).

* cited by examiner

ANTENNA MODULE, MANUFACTURING METHOD THEREOF, AND COLLECTIVE BOARD

CROSS-REFERENCE TO RELATED APPLICATIONS

The present application is a continuation application of International Patent Application No. PCT/JP2020/029223, filed Jul. 30, 2020, which claims priority to Japanese patent application JP 2019-177382, filed Sep. 27, 2019, the entire contents of each of which being incorporated herein by reference.

TECHNICAL FIELD

The present disclosure relates to an antenna module, a manufacturing method of the antenna module, and a collective board, and more particularly, to a structure that can reduce warpage in the manufacturing process of an antenna module formed by a multilayer substrate.

BACKGROUND ART

International Publication No. 2016-067969 (Patent Document 1) discloses an antenna module including radiating elements and a radio-frequency semiconductor device disposed in an integrated manner at a dielectric substrate having a multilayer structure. In the antenna module disclosed in Patent Document 1, transmission lines for suppling radio-frequency signals from the radio-frequency semiconductor device to the radiating elements are extended from the radio-frequency semiconductor device, passed in a dielectric layer between the mounting surface of the dielectric substrate having the radio-frequency semiconductor device and a ground electrode disposed in the dielectric substrate, further routed to portions under the radiating elements, and extended upwards to the radiating elements.

CITATION LIST

Patent Document

Patent Document 1: International Publication No. 2016/067969

SUMMARY OF INVENTION

Technical Problem

In the antenna modules such as the antenna module disclosed in International Publication No. 2016/067969, elements including feed lines for suppling a radio-frequency signal to radiating elements, and connection wires for connecting stubs and filters coupled to the feed lines, and other electronic components are usually formed in a dielectric layer (hereinafter also referred to as "wiring region") below a ground electrode in a dielectric substrate, for the purpose of reducing unnecessary coupling with the radiating elements to achieve sufficient antenna characteristics.

In such a structure, the ratio (residual copper ratio) of a conductor (typically, copper) included in a dielectric layer on the radiating element side (hereinafter also referred to as "antenna region") with respect to the ground electrode is lower than the residual copper ratio of the wiring region below the ground electrode. Resins and ceramics forming dielectrics are more easily deformed by residual stress or thermal stress than conductors used for wiring patterns. The dielectric layer of a relatively low residual copper ratio is thus more largely deformed than the dielectric layer of a relatively high residual copper ratio. As a result, in the case in which a dielectric substrate is formed by subjecting a stack of dielectric layers to a process such as pressing or heat pressing, when the residual copper ratio is unbalanced among stacked layers as in the antenna module described above, non-uniform deformation may cause warpage in the finished dielectric substrate.

The present disclosure has been made to address such a problem, and one object thereof is to reduce warpage of a dielectric substrate having a multilayer structure in an antenna module formed with the dielectric substrate.

Solution to Problem

An antenna module according to a first aspect of the present disclosure includes a dielectric substrate formed by stacking a plurality of dielectric layers, a radiating element formed at the dielectric substrate, a ground electrode facing toward the radiating element, and peripheral electrodes. The peripheral electrodes are formed in a plurality of layers between the radiating element and the ground electrode at end portions of the dielectric substrate. The peripheral electrodes are electrically coupled to the ground electrode.

A collective board according to a second aspect of the present disclosure forms a dielectric layer used for an antenna module. The collective board includes a first region including a plurality of individual boards of the dielectric layer and a second region formed between the plurality of individual boards. Peripheral electrodes are formed in the second region.

A manufacturing method of an antenna module according to a third aspect of the present disclosure includes manufacturing collective boards that respectively correspond to the plurality of dielectric layers and each include a plurality of individual boards. Each collective board includes a first region including the plurality of individual boards and a second region formed between the plurality of individual boards and including peripheral electrodes. The manufacturing method further includes stacking the collective boards and forming the antenna module by removing the second region and dividing the first region.

Advantageous Effects

In the antenna module according to the present disclosure, peripheral electrodes are arranged in a plurality of layers between the radiating elements and the ground electrode at end portions of the dielectric substrate. These peripheral electrodes increase the residual copper ratio of a region (antenna region) between the radiating elements and the ground electrode. As a result, it is possible to reduce warpage of the finished dielectric substrate because the difference in the residual copper ratio between the antenna region and the wiring region provided below the ground electrode is decreased.

DESCRIPTION OF EMBODIMENTS

Figure 1:
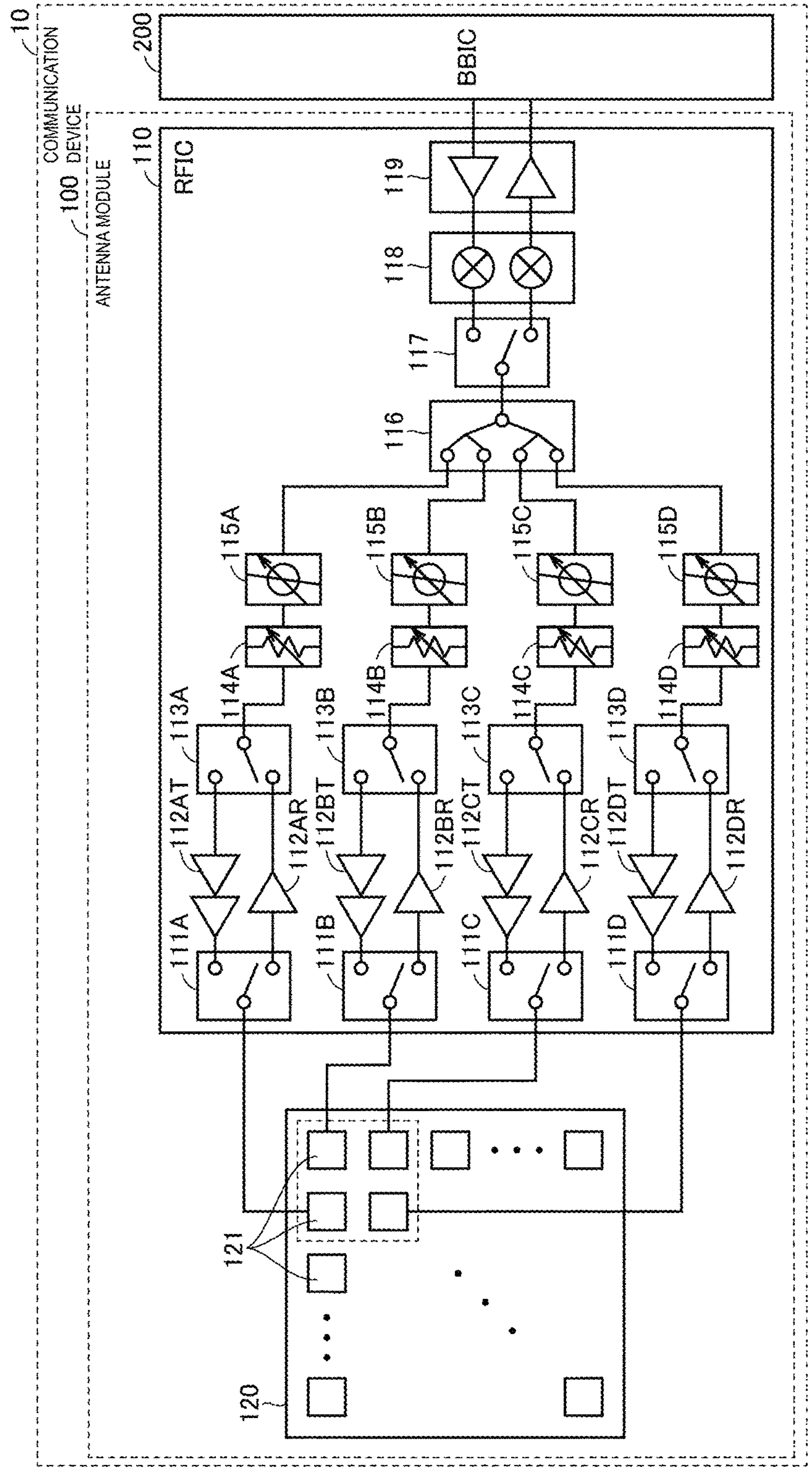
FIG. 1 is a block diagram of a communication device using an antenna module according to a first embodiment.

Hereinafter, embodiments of the present disclosure will be described in detail with reference to the drawings. Identical or corresponding portions in the drawings are assigned identical reference characters, and descriptions thereof are not repeated.

First Embodiment

Basic Configuration of Communication Device

FIG. 1 is an example of a block diagram of a communication device 10 using an antenna module 100 according to a first embodiment. Examples of the communication device 10 include portable terminals such as a mobile phone, a smartphone, and a tablet computer, and a personal computer having communication functionality. An example of frequency bands of radio waves used for the antenna module 100 according to the present embodiment is radio waves in millimeter-wave bands with center frequencies including 28 GHz, 39 GHz, and 60 GHz, but radio waves in frequency bands other than this example can also be used.

Referring to FIG. 1, the communication device 10 includes the antenna module 100 and a baseband integrated circuit (BBIC) 200 implementing a baseband-signal processing circuit. The antenna module 100 includes a radio-frequency integrated circuit (RFIC) 110, which is an example of a feed circuit, and an antenna device 120. In the communication device 10, a signal is transferred from the BBIC 200 to the antenna module 100, up-converted into a radio-frequency signal by the RFIC 110, and emitted from the antenna device 120. In the communication device 10, a radio-frequency signal is received by the antenna device 120, transferred to the RFIC 110 and down-converted into a signal, and processed by the BBIC 200.

For ease of description, FIG. 1 illustrates only configurations corresponding to four fed elements (radiating elements) 121 out of a plurality of fed elements 121 constituting the antenna device 120. Configurations corresponding to the other fed elements 121 having the same configuration are omitted. FIG. 1 illustrates an example in which the antenna device 120 is constituted by the plurality of fed elements 121 arranged in a two-dimensional array, but the fed elements 121 may be arranged in line as a one-dimensional array. The antenna device 120 may be constituted by only one fed element 121. In the present embodiment, the fed element 121 is a patch antenna formed as a flat plate.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner and splitter 116, a mixer 118, and an amplifier circuit 119.

When a radio-frequency signal is being transmitted, the switches 111A to 111D, and 113A to 113D are switched to establish connection to the power amplifiers 112AT to 112DT, and the switch 117 establishes connection to a transmit amplifier of the amplifier circuit 119. When a radio-frequency signal is received, the switches 111A to 111D, and 113A to 113D are switched to establish connection to the low-noise amplifiers 112AR to 112DR, and the switch 117 establishes connection to a receive amplifier of the amplifier circuit 119.

A signal transferred from the BBIC 200 is amplified by the amplifier circuit 119 and up-converted by the mixer 118. The transmit signal, which is the up-converted radio-frequency signal, is split into four signals by the signal combiner and splitter 116. The four signals are passed through four signal paths and separately supplied to the different fed elements 121. At this time, by controlling the phase shifters 115A to 115D disposed on the signal paths with respect to phase, the directivity of the antenna device 120 can be controlled.

By contrast, radio-frequency signals received by the fed elements 121 are transferred through four different signal paths and combined together by the signal combiner and splitter 116. The combined receive signal is down-converted by the mixer 118, amplified by the amplifier circuit 119, and transferred to the BBIC 200.

The RFIC 110 may be formed as, for example, a one-chip integrated-circuit component having the circuit configuration described above. Alternatively, in the RFIC 110, the particular devices (switches, power amplifier, low-noise amplifier, attenuator, and phase shifter) corresponding to each fed elements 121 may be formed as a one-chip integrated-circuit component for the fed element 121.

Antenna Module Structure

Figure 2:
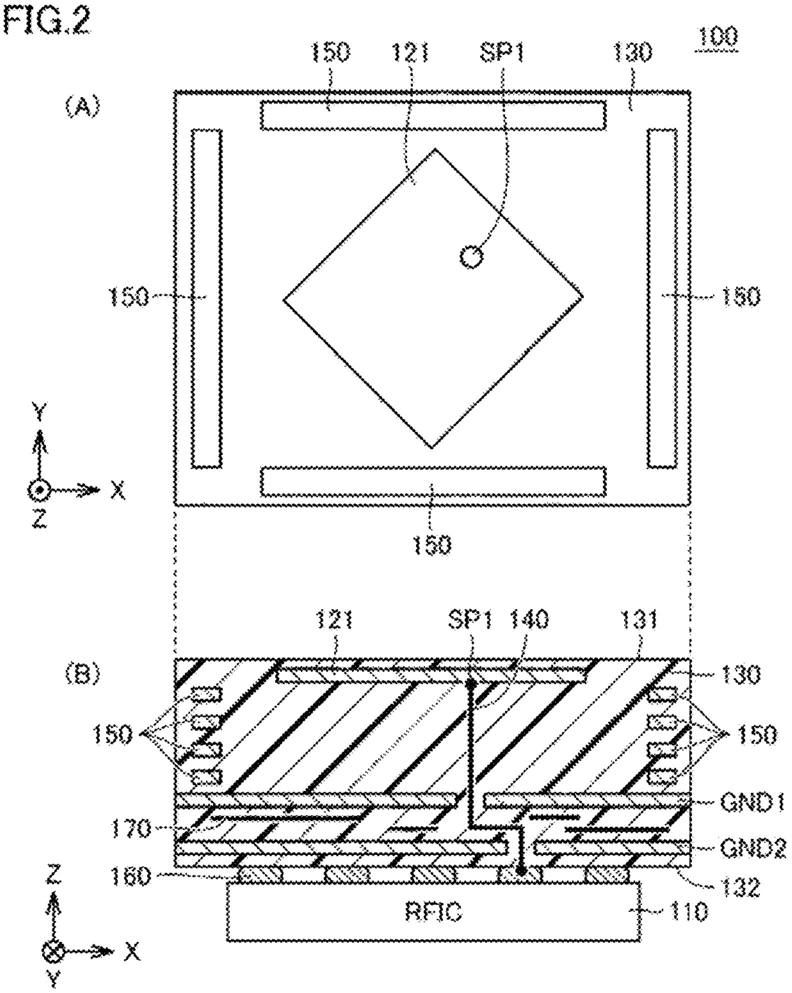
FIG. 2 provides a plan view and a cutaway side view of a first example of the antenna module according to the first embodiment.

Next, a structure of the antenna module according to the first embodiment will be described in detail with reference to FIG. 2. FIG. 2 illustrates the antenna module 100 of a first example according to the first embodiment. In FIG. 2, a plan view of the antenna module 100 is provided on the upper side (FIG. 2(A)), and a cutaway side view is provided on the lower side (FIG. 2(B)).

The antenna module 100 includes, in addition to the fed elements 121 and the RFIC 110, a dielectric substrate 130, a feed line 140, peripheral electrodes 150, and ground electrodes GND1 and GND2. In the following description, the normal direction (radiation direction of radio wave) of the dielectric substrate 130 is determined as the Z-axis direction, and a plane perpendicular to the Z-axis direction is defined by the X and Y axes. The side in the forward direction of the Z axis in the drawings may be referred to as upper side, and the side in the reverse direction may be referred to as lower side.

The dielectric substrate 130 may be, for example, a low temperature co-fired ceramics (LTCC) multilayer substrate, a multilayer resin substrate formed by stacking a plurality of layers made of a resin such as epoxy or polyimide, a multilayer resin substrate formed by stacking a plurality of resin layers made of a liquid crystal polymer (LCP) having a relatively low permittivity, a multilayer resin substrate formed by stacking a plurality of resin layers made of a fluorocarbon resin, or a multilayer ceramic substrate made of a ceramic other than LTCC.

The dielectric substrate 130 is formed in a substantially rectangular shape. The fed element 121 is disposed in a layer (upper layer) close to an upper surface 131 (surface in the forward direction of the Z axis). The fed element 121 may be exposed at a surface of the dielectric substrate 130 or disposed inside the dielectric substrate 130 as in the example in FIG. 2. It should be noted that, for ease of description, the embodiments of the present disclosure use the example in which only fed elements serving as radiating elements are used, but unfed elements and/or parasitic elements may be included in addition to fed elements.

In the example in FIG. 2, as illustrated in FIG. 2(A), the sides of the substantially square fed element 121 are tilted by 45° with respect to the sides of the dielectric substrate 130. This placement is applied with the aim of expanding the frequency bandwidth for radiation of radio wave by leaving a space from the end of the fed element 121 to the end of the dielectric substrate 130 in the polarization direction of radio waves radiated by the fed element 121.

The plate-like ground electrode GND2 is disposed in a layer (lower layer) closer to a lower surface 132 (surface in the reverse direction of the Z axis) than to the fed element 121 in the dielectric substrate 130. The ground electrode GND2 faces toward the fed element 121. The ground electrode GND1 is disposed in a layer between the fed element 121 and the ground electrode GND2.

The layer between the ground electrodes GND1 and GND2 is used as a wiring region. A wiring patterns 170 forming elements such as feed lines for suppling a radio-frequency signal to radiating elements, and connection wires for connecting stubs and filters coupled to the feed lines, and other electronic components is disposed in the wiring region. As such, the wiring region is formed in a dielectric layer opposite to the fed element 121 with respect to the ground electrode GND1, and as a result, it is possible to reduce unnecessary coupling between the fed element 121 and the wiring patterns 170.

The RFIC 110 is mounted on the lower surface 132 of the dielectric substrate 130 with the solder bumps 160 interposed between the RFIC 110 and the dielectric substrate 130. The RFIC 110 may be coupled to the dielectric substrate 130 by a multi-pole connector instead of solder joints.

The RFIC 110 supplies a radio-frequency signal to a feed point SP1 of the fed element 121 through the feed line 140. The feed line 140 is extended upwards from the RFIC 110 through the ground electrode GND2 and routed in the wiring region. The feed line 140 is further extended upwards from a portion under the fed element 121 through the ground electrode GND1 and consequently coupled to the feed point SP1 of the fed element 121.

In the example in FIG. 2, the feed point SP1 of the fed element 121 is offset from the center of the fed element 121 by a given distance in both the forward direction of the X axis and the forward direction of the Y axis. Because the feed point SP1 is provided at this position, the fed element 121 radiates a radio wave polarized in the direction tilted by 45° from the forward direction of the X axis to the forward direction of the Y axis.

The peripheral electrodes 150 are formed in a plurality of dielectric layers between the fed element 121 and the ground electrode GND1 at end portions of the dielectric substrate 130. When viewed in a plan view in the normal direction (forward direction of the Z axis) of the dielectric substrate 130, the peripheral electrodes 150 are disposed along the sides of the rectangular dielectric substrate 130 in the antenna module 100. The peripheral electrodes 150 disposed along the sides are symmetrically positioned with respect to the fed element 121.

Figure 9:
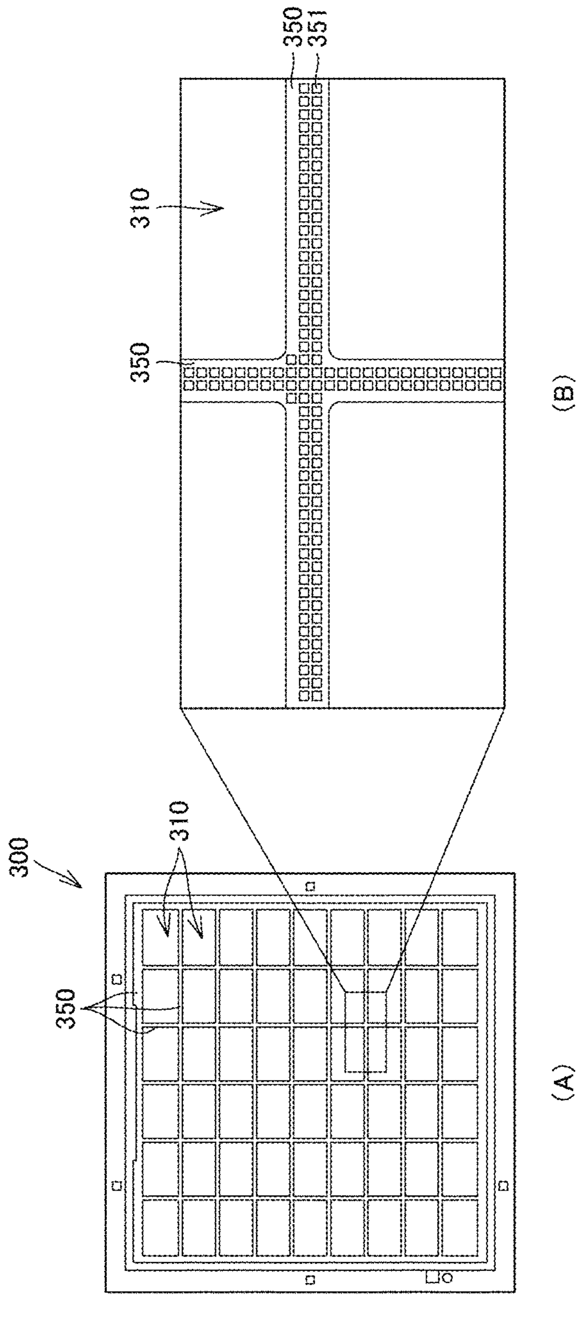
FIG. 9 is an enlarged view of a portion including peripheral electrodes of the collective board in FIG. 8.

When the dielectric substrate 130 is viewed in a plan view, the peripheral electrodes 150 disposed along one side of the dielectric substrate 130 coincide with each other in the stacking direction. This means that the peripheral electrodes 150 form deemed conductive walls along the sides of the dielectric substrate 130. It is preferable that the peripheral electrodes 150 be formed as meshes having a plurality of cavities as illustrated in FIG. 9 described later. Because the peripheral electrodes 150 have cavities, when the dielectric substrate 130 is formed by pressure-bonding a plurality of dielectric layers with each other, adjacent dielectrics are joined through the cavities, resulting in increased close contact between the dielectric layers of the dielectric substrate 130.

In FIG. 2, the conductors forming, for example, the fed element elements, electrodes, and vias are made of a metal mainly containing aluminum (Al), copper (Cu), gold (Au), silver (Ag), or an alloy thereof.

Of a patch antenna formed by a dielectric substrate having the multilayer structure described above, antenna characteristics are affected by the structure of an antenna region between a ground electrode and a radiating element facing toward the antenna region. For example, when a device or wire establishing coupling with the radiating element is disposed in the antenna region, losses may increase, or the frequency band for radiation of radio wave may narrow.

For this reason, elements such as connection wires for connecting stubs and filters coupled to the feed lines, and other electronic components are usually formed in a dielectric layer (wiring region) below a ground electrode in a dielectric substrate, for the purpose of reducing unnecessary coupling with the radiating elements to achieve sufficient antenna characteristics.

In such a structure, the residual copper ratio of the antenna region on the radiating element side with respect to the ground electrode of the dielectric substrate is lower than the residual copper ratio of the wiring region below the ground electrode. Resins and ceramics forming dielectrics are more easily deformed by residual stress or thermal stress than conductors used for wiring patterns. The dielectric layer of a relatively low residual copper ratio is thus more largely deformed than the dielectric layer of a relatively high residual copper ratio. As a result, in the case in which a dielectric substrate is formed by subjecting a stack of dielectric layers to a process such as pressing or heat pressing, when the residual copper ratio is unbalanced among stacked layers as in the antenna module described above, non-uniform deformation may cause warpage in the finished dielectric substrate.

In the antenna module 100 according to the first embodiment, as described above, the conductive walls of the peripheral electrodes 150 are formed at end portions of the dielectric substrate 130. As compared to the structure without the peripheral electrodes 150, this structure can increase the residual copper ratio of the antenna region between the fed element 121 and the ground electrode GND1. As such, the difference between the residual copper ratio of the wiring region below the ground electrode GND1 of the dielectric substrate 130 and the residual copper ratio of the antenna region can be decreased, and thus, it is possible to reduce warpage of the finished dielectric substrate 130.

When the area of the ground electrode is not large enough for the radiating element, some lines of electric force between the radiating element and the ground electrode may be directed behind the ground electrode. The directivity accordingly appears on the back side, and as a result, the gain in the desired direction may decrease, or the frequency bandwidth may narrow.

In the antenna module according to the first embodiment, the adjacent peripheral electrodes 150 in the stacking direction can be capacitive-coupled to each other. Additionally, the lowest peripheral electrodes 150 can also be capacitive-coupled to the ground electrode GND1. This means that the conductive walls formed by the peripheral electrodes 150 can be deemed as the equivalent of the structure formed by extending the end portions of the ground electrode GND1 toward the upper surface of the dielectric substrate 130. The conductive walls can thus strengthen the degree of coupling between the fed element 121 and the ground electrode GND1. This structure can reduce the likelihood that some lines of electric force between the radiating element and the ground electrode are directed behind the ground electrode. As described above, when the area of the dielectric substrate 130 is not large enough for the fed element 121 for the purpose of downsizing the device, the leakage of lines of electric force out of the dielectric substrate 130 is reduced by providing the peripheral electrodes 150 described above to strengthen the degree of coupling between the fed element 121 and the ground electrode GND1. As a result, antenna characteristics can be improved.

Second Example

Figure 3:
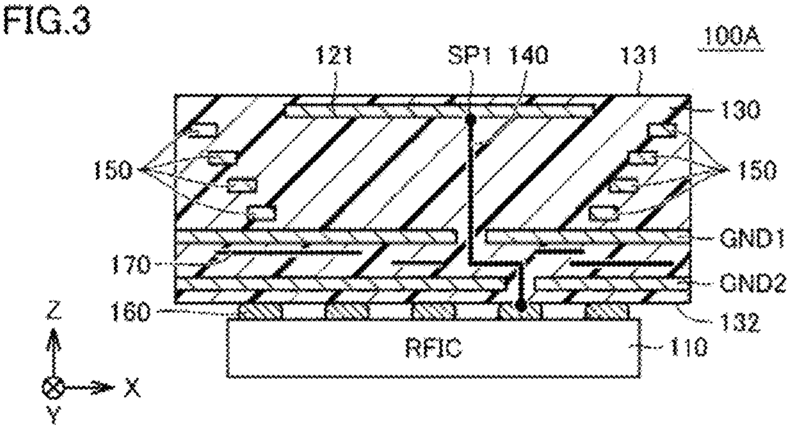
FIG. 3 is a cutaway side view of a second example of the antenna module according to the first embodiment.

FIG. 3 is a cutaway side view of an antenna module 100A of a second example according to the first embodiment. The arrangement of the peripheral electrodes 150 in the stacking direction in the antenna module 100A is different from the antenna module 100 illustrated in FIG. 2. Other structures of the antenna module 100A are the same as the antenna module 100, and redundant descriptions of the same elements are not repeated.

More specifically, referring to FIG. 3, as the dielectric layer including the peripheral electrode 150 approaches the ground electrode GND1, the peripheral electrode 150 approaches the middle of the dielectric substrate 130 in the antenna module 100A. In other words, when viewed in a plan view in the normal direction of the dielectric substrate 130, as the peripheral electrode 150 approaches the ground electrode GND1, the peripheral electrode 150 approaches the fed element 121.

This structure also strengthens the degree of coupling between the fed element 121 and the ground electrode GND1, resulting in improved antenna characteristics. Moreover, the dielectric surrounded by the fed element 121, the ground electrode GND1, and the conductive walls of the peripheral electrodes 150 is smaller than the structure of the antenna module 100 illustrated in FIG. 2, and thus, the electrostatic capacity between the fed element 121 and the ground electrode GND1 is decreased. Thus, it is possible to expand the frequency bandwidth for radiation of radio wave.

Antenna Characteristics

Figure 4:
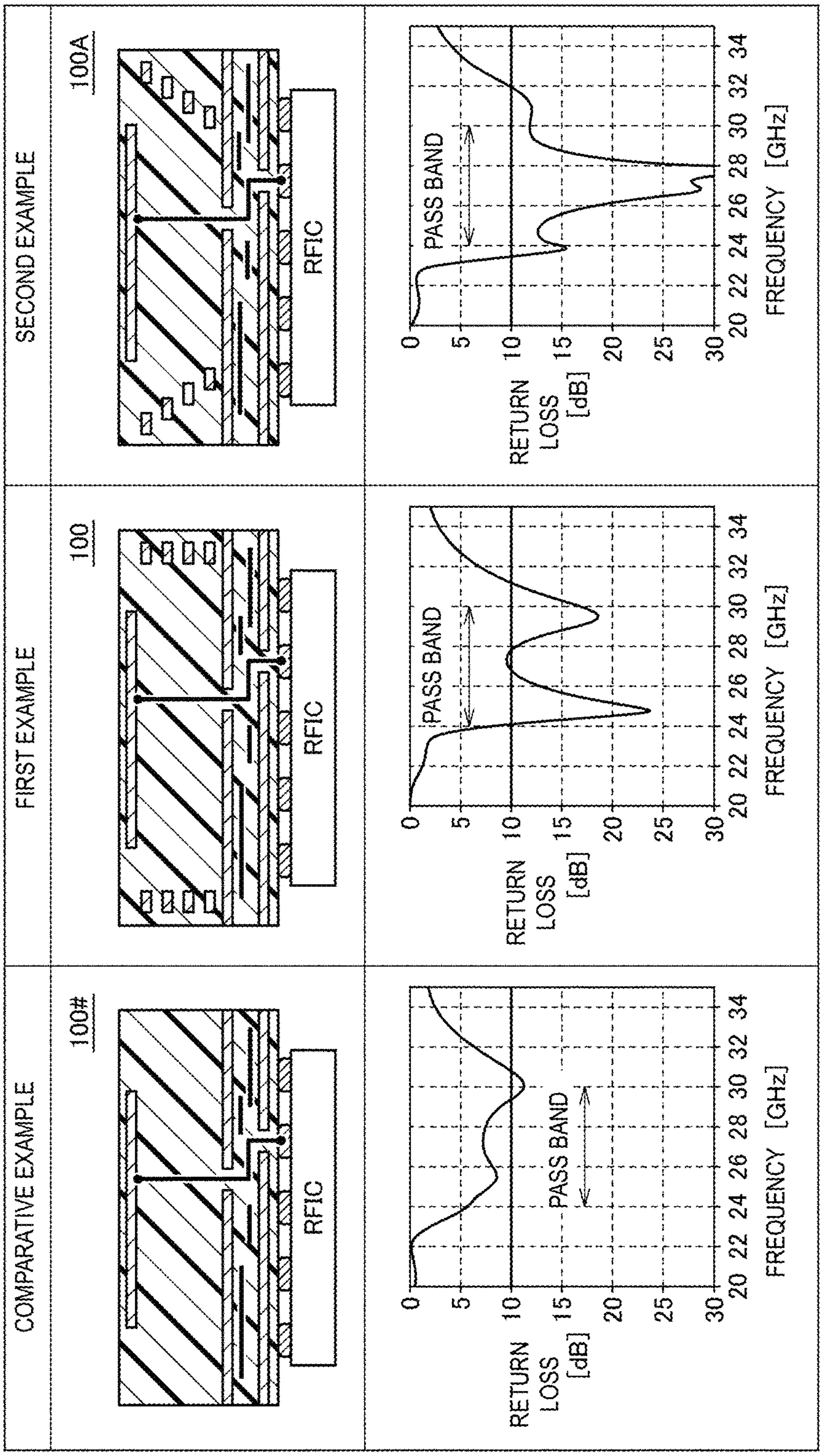
FIG. 4 is a first drawing illustrating an antenna characteristic of the antenna module in FIG. 2 and an antenna characteristic of the antenna module in FIG. 3.
Figure 5:
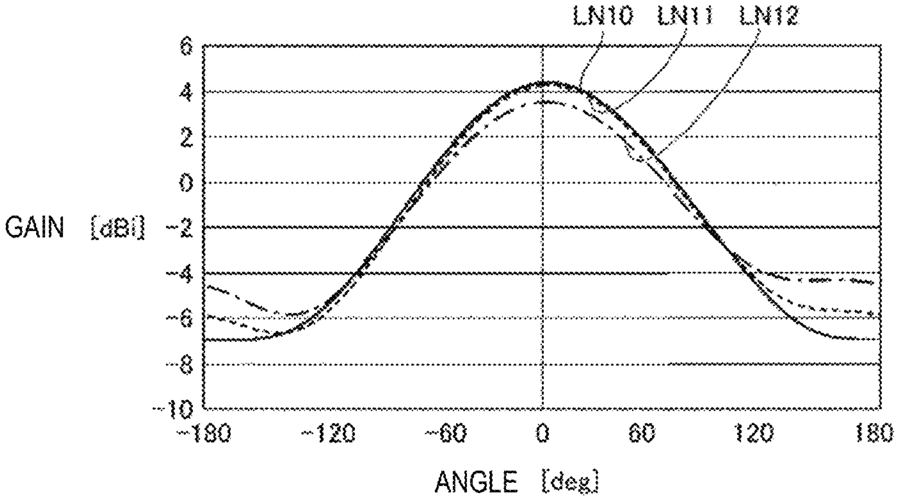
FIG. 5 is a second drawing illustrating an antenna characteristic of the antenna module in FIG. 2 and an antenna characteristic of the antenna module in FIG. 3.

The following describes antenna characteristics of the antenna modules 100 and 100A according to the first embodiment with reference to FIGS. 4 and 5. As a comparative example, an antenna module 100 # without the peripheral electrodes 150 is described with reference to FIGS. 4 and 5. Except for the peripheral electrodes 150, the structure of the antenna module 100 # of the comparative example is the same as the antenna modules 100 and 100A, and the description thereof is not repeated.

FIG. 4 illustrates the result of a simulation about return loss with respect to the antenna module 100 # of the comparative example, the antenna module 100 of the first example, and the antenna module 100A of the second example. In graphs in FIG. 4, the horizontal axis indicates frequency, and the vertical axis indicates return loss. In this simulation, the target pass band is 24 to 30 GHz, and the return loss range in specifications is the range of 10 dB or less.

Referring to FIG. 4, the return loss of the antenna module 100 # of the comparative example exceeds the limit in the specifications over the target pass band except frequencies close to 30 GHZ. By contrast, the return loss of the antenna module 100 of the first example is within the specification range over the entire target pass band. As such, the antenna characteristic of the antenna module 100 of the first example is improved as compared to the comparative example.

The return loss of the antenna module 100A of the second example is decreased more than the antenna module 100 of the first example, and additionally, the specification of return loss is satisfied over an expanded frequency band.

FIG. 5 indicates peak gain of each antenna module. In FIG. 5, the horizontal axis indicates angle relative to the normal direction of the fed element 121, and the vertical axis indicates peak gain. In FIG. 5, a solid line LN10 indicates the case of the antenna module 100A of the second example, a dashed line LN11 indicates the case of the antenna module 100 of the first example, and a dot-dash line LN12 indicates the case of the antenna module 100 # of the comparative example.

Referring to FIG. 5, it can be seen that the peak gain of the antenna module 100 according to the first embodiment and the peak gain of the antenna module 100A according to the first embodiment at an angle of 0° is higher by approximately 1 dBi than the comparative example. When the antenna module 100 is compared to the antenna module 100A, the peak gain of the antenna module 100A is higher by approximately 0.1 dB than the antenna module 100.

Concerning the radiation of radio wave in the range exceeding ±90°, that is, the radiation behind the back side of the antenna module, the gain of the antenna module 100 according to the first embodiment and the gain of the antenna module 100A according to the first embodiment are lower than the comparative example. This means that the radiation of radio wave in unnecessary directions (back surface) is reduced.

As described above, antenna characteristics of the antenna module formed by a dielectric substrate having a multilayer structure can be improved by forming conductive walls of peripheral electrodes at end portions of the dielectric substrate. With this structure, the antenna module can achieve desired specifications when the dielectric substrate is not large enough for the radiating element.

First Modification

In the descriptions of the antenna modules 100 and 100A of the first and second examples, the peripheral electrodes are capacitive-coupled to each other, and the peripheral electrodes and the ground electrode are capacitive-coupled to each other. The peripheral electrodes may be, however, directly coupled to the ground electrode.

Figure 6:
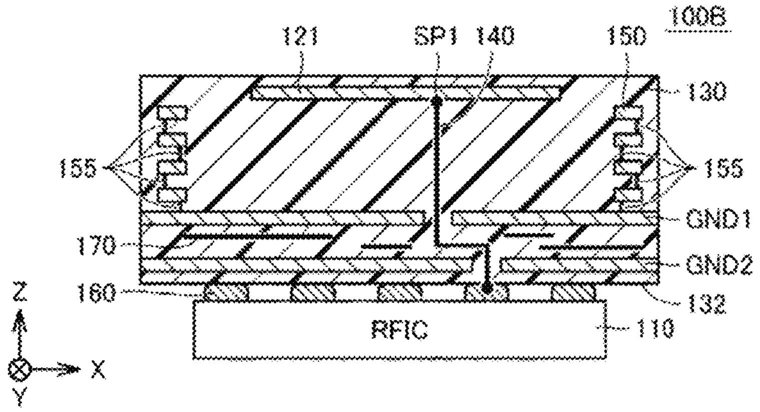
FIG. 6 is a cutaway side view of an antenna module of a first modification.

FIG. 6 is a cutaway side view of an antenna module 100B according to a first modification. Referring to FIG. 6, in the antenna module 100B, the adjacent peripheral electrodes 150 in the stacking direction are coupled to each other by vias 155. The lowest peripheral electrodes 150 are also coupled to the ground electrode GND1 by the vias 155. This means that in the antenna module 100B the peripheral electrodes 150 effectively serve as the ground electrode GND1. Consequently, the fed element 121 and the peripheral electrodes 150 are more easily coupled to each other, and thus, antenna characteristics can be further improved.

Dielectrics such as resins and ceramics used for the dielectric substrate 130 are usually easy to cause static electricity. Hence, in the manufacturing process of the antenna module, the dielectric substrate 130 may be transported in the state in which the dielectric substrates charged with static electricity are stacked. Static electricity in the dielectric can be reduced by providing peripheral electrodes coupled to the ground electrode in a plurality of layers of the dielectric substrate 130 as the antenna module 100 of the first modification. As such, it is possible to reduce the likelihood of occurrence of faults during transportation of the dielectric substrate.

It is preferable that in the antenna module 100B the vias 155 formed in adjacent dielectric layers in the stacking direction do not overlap when viewed in a plan view in the normal direction of the dielectric substrate 130. When pressurized, the compressibility of the conductive material (typically, copper) forming the via 155 is lower than the compressibility of the dielectric material. Hence, if the vias 155 of the individual layers are all disposed at the same position when viewed in a plan view in the normal direction of the dielectric substrate 130, when the dielectric substrate 130 is pressed to bond dielectric layers by pressure bonding, the thickness of the portion of the via 155 is reduced more than other dielectric portions. This may cause variations in thickness in the dielectric substrate 130. In this regard, by disposing at different positions the vias 155 of adjacent dielectric layers in the stacking direction, it is possible to improve the precision of thickness of the finished dielectric substrate 130.

The peripheral electrodes may be coupled to each other by capacitive coupling as in FIG. 2 and vias as in FIG. 6 in a mixed manner. This means that in the present embodiment the expression "electrically coupled" includes both direct coupling using vias and capacitive coupling. The peripheral electrodes are not necessarily disposed at regular intervals in the stacking direction. For example, some peripheral electrodes may be disposed at an interval wider than other peripheral electrodes.

Second Modification

The first embodiment and the first modification have described the example of an antenna module including one fed element serving as a radiating element, but the antenna module may be an array antenna including a plurality of radiating elements.

Figure 7:
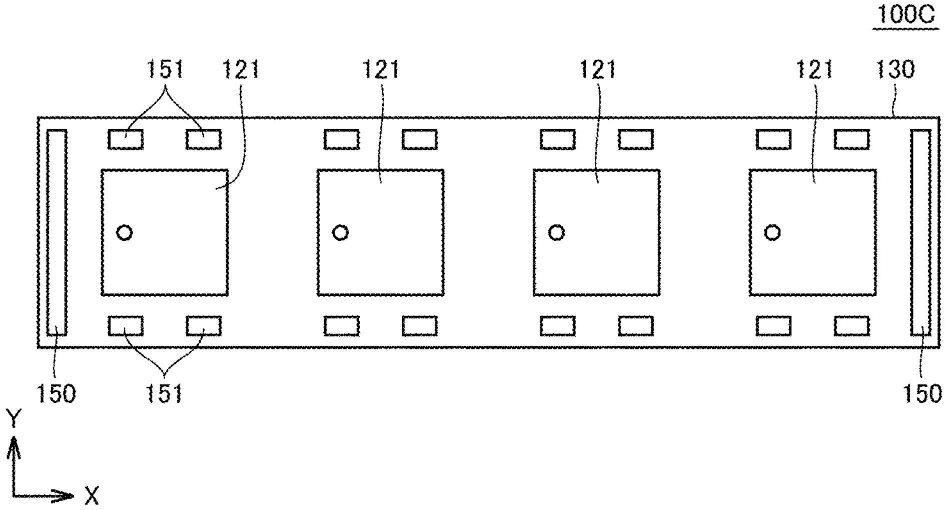
FIG. 7 is a plan view of an antenna module of a second modification.

FIG. 7 is a plan view of an antenna module 100C of a second modification. In the example of the antenna module 100C, four fed elements 121 are arranged in line in the long-side direction (X-axis direction in FIG. 7) of the rectangular dielectric substrate 130, forming a structure of one-dimensional array. In the antenna module 100C the sides of each fed elements 121 are parallel to the sides of the dielectric substrate 130, but the fed elements may be tilted with respect to the sides of the dielectric substrate 130 as in the first embodiment. The antenna module may be an array antenna including the fed elements 121 arranged in a two-dimensional array.

At the end portions of the short sides of the dielectric substrate 130, the peripheral electrodes 150 are disposed in a layer between the fed element 121 and the ground electrode GND1 in the direction (Y-axis direction) in which the short sides are extended. Also, at the end portions of the long sides of the dielectric substrate 130, peripheral electrodes 151 are disposed in the direction (X-axis direction) in which the long sides are extended. About the antenna module 100C, the example in which the plurality of peripheral electrodes 151 are arranged with spaces therebetween along the X axis is described, but one peripheral electrode may be extended over one long side, which is similar to the peripheral electrode 150 extended along the Y axis.

Also in such an array antenna, peripheral electrodes are arranged in a layer (antenna region) between the fed element 121 and the ground electrode GND1, and as a result, the residual copper ratio of the antenna region is increased. As such, it is possible to reduce warpage of the dielectric substrate 130. Moreover, peripheral electrodes are arranged at end portions of the substrate at which it is difficult to leave sufficient areas of dielectric, and thus, the degree of coupling between the fed element 121 and the ground electrode GND1 is increased, resulting in improved antenna characteristics.

In the structure as in FIG. 7, when the length of the peripheral electrode 151 disposed along the long side of the dielectric substrate 130 is shorter than the length of the peripheral electrode 150 disposed along the short side, it is possible to reduce warpage locally caused in the dielectric substrate 130 under the effect of the peripheral electrode 151 in the long-side direction.

To reduce warpage of the dielectric substrate 130, the peripheral electrode 151 disposed along one long side of the dielectric substrate 130 may be formed to have a length different from the length of the peripheral electrode 151 disposed along the other long side. Alternatively, to reduce warpage of the dielectric substrate 130, the peripheral electrode 151 disposed along one long side may differ from the peripheral electrode 151 disposed along the other long side with respect to the number of electrodes along the side and/or the number of electrodes in the thickness direction. As described above, by controlling the number and/or length of the peripheral electrodes 151 disposed along each of the two long sides, it is possible to reduce warpage especially when the distance from the fed element 121 to the end portion of the dielectric substrate 130 differs between the different long sides. In this case, the peripheral electrodes 151 may be arranged along only one side.

Second Embodiment

Collective Board Structure

As described in the first embodiment and modifications, the antenna module has the structure including a stack of dielectric layers. In a typical manufacturing process, a dielectric substrate is formed as follows: collective boards of different kinds of dielectric layers are individually formed by arranging in a matrix a plurality of individual boards of the same kind of dielectric layer; a stack of the collective boards are bonded together by heat pressing; the individual boards are cut off by, for example, a dicer.

The first embodiment has described the example in which peripheral electrodes are formed in an individual board. A second embodiment describes an example in which peripheral electrodes are formed around an individual board in a collective board, instead of arranging peripheral electrodes in an individual board.

Figure 8:
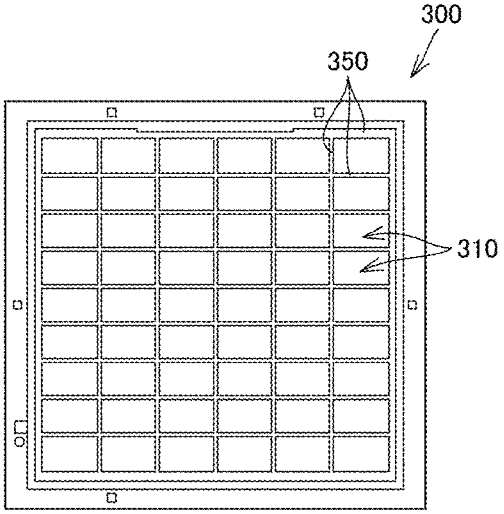
FIG. 8 illustrates a collective board according to a second embodiment.

FIG. 8 illustrates a collective board 300 according to the second embodiment. The collective board 300 is basically made of a dielectric plate and conductive members formed on a surface of the dielectric. The conductive members form, for example, the fed elements 121, the ground electrodes GND1 and GND2, the wiring patterns 170, and vias, which have been described with reference to drawings including FIG. 2.

The collective board 300 has a structure including a plurality of individual boards 310 arranged in a matrix as a two-dimensional array. The individual boards 310 correspond to dielectric layers forming the dielectric substrate 130 illustrated in FIG. 2. The individual boards 310 in one collective board 300 have the same kind of dielectric layer. The conductive members are formed at the individual boards 310 at corresponding positions in the stacking direction.

Peripheral electrodes 350 are disposed between adjacent individual boards 310 and at outer side portions of the collective board 300. This means that the peripheral electrodes 350 are shaped into a grid, and the individual boards 310 are formed inside the grid.

FIG. 9 provides an enlarged view of a portion including the peripheral electrodes 350 of the collective board 300. As illustrated in the enlarged view in FIG. 9(B), a plurality of cavities 351 are formed as a mesh in the peripheral electrodes 350. As described above, the dielectric substrate 130 is formed by stacking a plurality of kinds of the collective boards 300, pressure-bonding the stack of the collective boards 300, and dividing the stack of the collective boards 300 into the individual boards 310 by cutting. Because the cavities 351 are formed in the peripheral electrodes 350, the dielectric materials are connected with each other through the cavities 351 during pressure bonding. This can strengthen the degree of close contact between dielectric layers.

When the collective boards 300 are cut to separate the individual boards 310, the peripheral electrodes 350 are removed. This means that, unlike the case of the first embodiment, the peripheral electrodes 350 are not left in the individual boards 310 forming the dielectric layers of the dielectric substrate 130. However, because the peripheral electrodes 350 are formed in the collective boards corresponding to the dielectric layers forming the antenna region between the fed element 121 and the ground electrode GND1, the residual copper ratio of the dielectric layers forming the antenna region is increased when the stack of the collective boards 300 are pressure bonded together. As a result, it is possible to reduce warpage of the collective board 300 after pressure bonding, and accordingly, it is also possible to mitigate warpage of the individual boards 310 separated by cutting.

Manufacturing Process of Antenna Module

Figure 10:
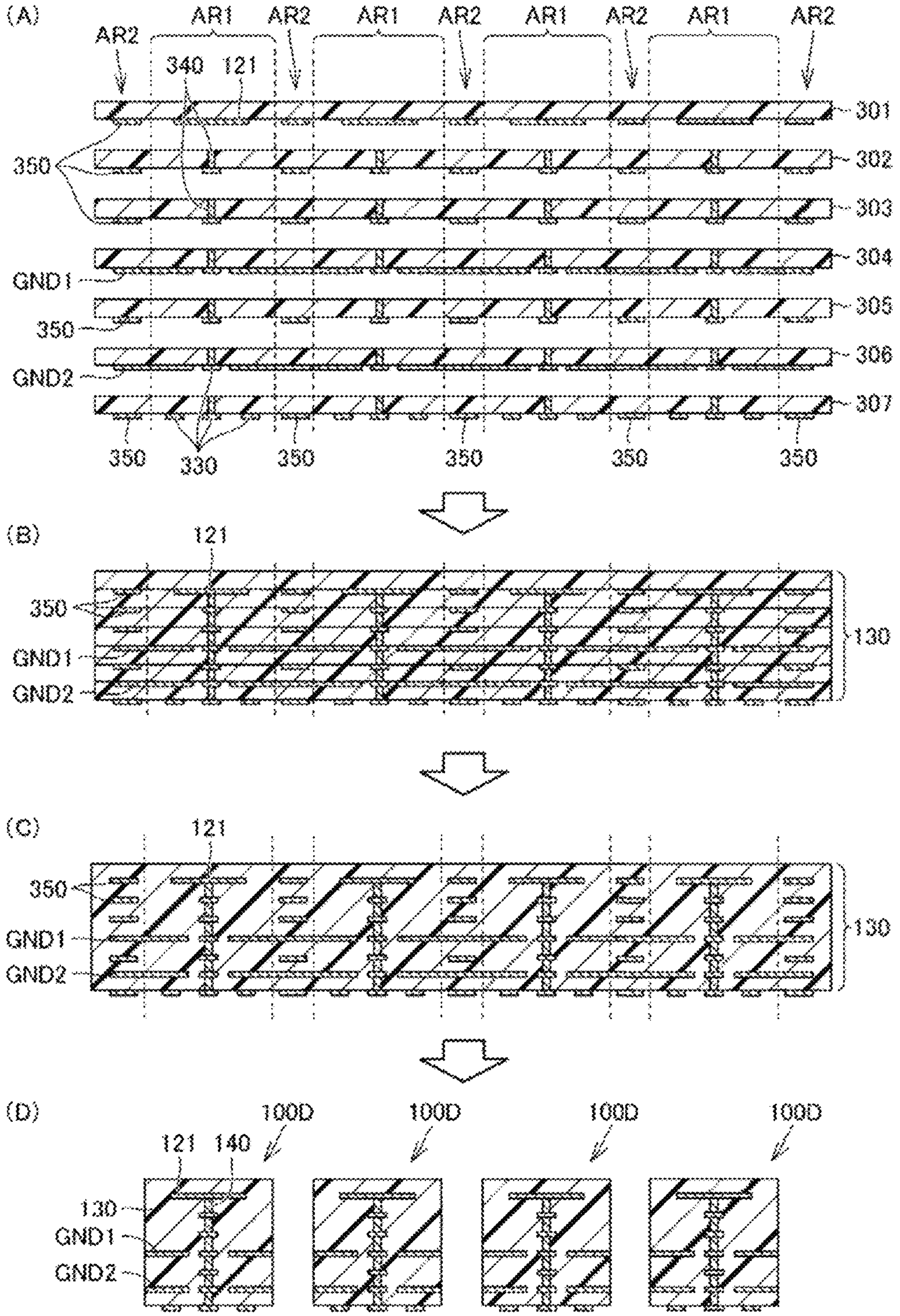
FIG. 10 illustrates a manufacturing process of an antenna module in the case of using the collective board according to the second embodiment.

FIG. 10 illustrates a manufacturing process of an antenna module using the collective board 300 according to the second embodiment.

Referring to FIG. 10(A), firstly, collective boards 301 to 307 corresponding to dielectric layers are prepared to form the dielectric substrate 130. The collective board is formed by etching a desired shape in a copper foil fixed to one surface of a dielectric sheet. Vias are also formed to penetrate the dielectric sheet as needed. In each collective board, first regions AR1 each including an individual board and second regions AR2 formed between adjacent individual boards or formed at outer side portions with respect to the individual boards are formed. The peripheral electrodes 350 are formed in the second regions AR2 formed at the outer side portions with respect to the individual boards.

The fed element 121 is formed in the first region AR1 of the collective board 301. The peripheral electrode 350 is formed in the second regions AR2. The collective boards 302 and 303 correspond to dielectric layers of the antenna region. In each of the first region AR1 of the collective board 302 and the first region AR1 of the collective board 303, a via 340 forming a portion of the feed line 140 and an electrode pad 330 connected to the via 340 are formed.

The collective boards 304 and 306 correspond to dielectric layers respectively forming the ground electrodes GND1 and GND2. In the collective boards 304 and 306, the peripheral electrodes are formed in the second regions AR2 in the manner in which the peripheral electrodes are combined with the ground electrodes.

The collective board 305 is disposed between the collective boards 304 and 306. The collective board 305 corresponds to a dielectric layer forming a wiring layer. In the description of the example in FIG. 10, for ease of description, the collective board 305 solely corresponds to the wiring layer, but a plurality of collective boards may form the wiring layer. Wiring patterns forming, for example, connection wires connecting filters, stubs, and devices, and the via 340 and the electrode pad 330 forming a portion of the feed line 140 are formed in the first region AR1 of the collective board 305. The peripheral electrode 350 is formed in the second region AR2 of the collective board 305.

The collective board 307 corresponds to a dielectric layer for mounting devices such as the RFIC 110. The via 340 and the electrode pad 330 for establishing electrical connection with external devices are formed in the first region AR1 of the collective board 307.

After all the collective boards 301 to 307 are prepared to form the dielectric substrate 130, the collective boards 301 to 307 are stacked (FIG. 10(B)), and the collective boards are pressure bonded together by heat pressing (FIG. 10(C)).

Subsequently, the dielectric substrate 130 formed by pressure bonding the collective boards are cut by, for example, a dicer at the boundaries between the first regions AR1 and the second regions AR2, which are indicated by dashed lines in the drawing, and the second regions AR2 are then removed. As such, the antenna module 100D is formed (FIG. 10(D)).

Because the antenna module is formed in accordance with the manufacturing process described above, in the pressure bonding process for collective boards, the residual copper ratio of the antenna region between the fed element and the ground electrode is increased by using the peripheral electrodes. It is thus possible to reduce warpage of the dielectric substrate when the pressure bonding process finishes.

The embodiments disclosed herein should be considered as examples in all respects and not construed in a limiting sense. The scope of the present disclosure is indicated by the claims instead of the above description of the embodiments, and all changes which come within the meaning and range of equivalency of the claims are therefore intended to be embraced therein.

The invention claimed is:

1. An antenna module comprising:

a dielectric substrate formed by stacking a plurality of dielectric layers;

a plurality of radiating elements formed on or within the dielectric substrate;

a ground electrode facing the plurality of radiating elements; and peripheral electrodes formed in the plurality of dielectric layers between the plurality of radiating elements and the ground electrode at an outer periphery of the dielectric substrate when viewed in a plan view in a normal direction of the dielectric substrate, the peripheral electrodes being electrically coupled to the ground electrode, wherein a length of a first peripheral electrode disposed along a long side of the dielectric substrate, among the peripheral electrodes, is different from a length of a second peripheral electrode disposed along a short side of the dielectric substrate, among the peripheral electrodes.

2. The antenna module of claim 1, wherein the plurality of dielectric layers are stacked such that the peripheral electrodes form conductive walls.

3. The antenna module of claim 1, wherein the peripheral electrodes are capacitive-coupled to the ground electrode.

4. The antenna module of claim 1, further comprising:

a plurality of vias that connect the peripheral electrodes to each other.

5. The antenna module of claim 1, further comprising:

a plurality of vias that connect the peripheral electrodes and the ground electrode.

6. The antenna module of claim 4, wherein when the plurality of vias are viewed in the plan view in the normal direction of the dielectric substrate, vias formed in adjacent dielectric layers of the plurality of dielectric layers do not overlap.

7. The antenna module of claim 1, wherein the peripheral electrodes are formed in all dielectric layers between the plurality of radiating elements and the ground electrode.

8. The antenna module of claim 1, wherein a plurality of cavities are formed in the peripheral electrodes.

9. The antenna module of claim 1, wherein when the peripheral electrodes are viewed in the plan view in the normal direction of the dielectric substrate, the peripheral electrodes are symmetrically arranged with respect to the plurality of radiating elements.

10. The antenna module of claim 1, wherein in the dielectric substrate, a wiring region is formed in a dielectric layer opposite to the plurality of radiating elements with respect to the around, electrode, and the wiring region does not include the peripheral electrodes.

11. The antenna module of claim 1, wherein when viewed in the plan view in the normal direction of the dielectric substrate, as the peripheral electrodes approach the ground electrode, the peripheral electrodes approach a center of the plurality of radiating elements.

12. The antenna module of claim 1, wherein the dielectric substrate includes first and second sides of a first length and third and fourth sides of a second length, the first length being greater than the second length.

13. The antenna module of claim 12, wherein a first plurality of the peripheral electrodes formed along a periphery of the first and second sides have a third length in a lengthwise direction of the first and second sides, and a second plurality of the peripheral electrodes formed along a periphery of the third and fourth sides have a fourth length in a lengthwise direction of the third and fourth sides.

14. The antenna module of claim 13, wherein the third length of the first plurality of the peripheral electrodes is less than the fourth length of the second plurality of the peripheral electrodes.

15. The antenna module of claim 13, wherein a number of the first plurality of the peripheral electrodes is greater than a number of the second plurality of the peripheral electrodes.

16. The antenna module of claim 1, wherein the length of the first peripheral electrode is less than the length of the second peripheral electrode.

17. The antenna module of claim 1, wherein a width of the first peripheral electrode is less than a width of the second peripheral electrode.

18. The antenna module of claim 1, wherein the first peripheral electrode is among a plurality of first peripheral electrodes spaced apart from one another.

19. An antenna module comprising:

a dielectric substrate formed by stacking a plurality of dielectric layers;

a plurality of radiating elements formed on or within the dielectric substrate;

a ground electrode facing the plurality of radiating elements; and peripheral electrodes formed in the plurality of dielectric layers between the plurality of radiating elements and the ground electrode, the peripheral electrodes being electrically coupled to the ground electrode and including:

first peripheral electrodes disposed along a long side of the dielectric substrate; and second peripheral electrodes disposed along a short side of the dielectric substrate, wherein the first peripheral electrodes have a length that is less than a length of the second peripheral electrodes.

20. The antenna module of claim 19, wherein a width of the first peripheral electrode is less than a width of the second peripheral electrode.

* * * * *